(12) United States Patent
Gholston et al.

(10) Patent No.: US 10,363,623 B2
(45) Date of Patent: Jul. 30, 2019

(54) DESOLDERING APPARATUS AND METHOD

(71) Applicant: Power to the PCB, LLC, Essex, MD (US)

(72) Inventors: Javon M. Gholston, Essex, MD (US); Michael W. Heier, Jr., Baltimore, MD (US)

( * ) Notice: Subject to any disclaimer, the term of this patent is extended or adjusted under 35 U.S.C. 154(b) by 318 days.

(21) Appl. No.: 15/245,279

(22) Filed: Aug. 24, 2016

(65) Prior Publication Data

US 2017/0056996 A1 Mar. 2, 2017

Related U.S. Application Data

(60) Provisional application No. 62/208,947, filed on Aug. 24, 2015.

(51) Int. Cl.
| | |
|---|---|
| *B23K 1/018* | (2006.01) |
| *B23K 3/00* | (2006.01) |
| *B23K 3/02* | (2006.01) |
| *B23K 1/00* | (2006.01) |

(52) U.S. Cl.
CPC ............ *B23K 1/018* (2013.01); *B23K 1/0016* (2013.01); *B23K 3/029* (2013.01)

(58) Field of Classification Search
CPC ....... B23K 1/018; B23K 3/0369; B23K 3/029
See application file for complete search history.

(56) References Cited

U.S. PATENT DOCUMENTS

| | | | | |
|---|---|---|---|---|
| 4,746,050 | A * | 5/1988 | Brown ................... | B23K 1/018 228/19 |
| 4,919,322 | A * | 4/1990 | Fortune .................. | A61B 17/50 222/570 |
| 2013/0105466 | A1* | 5/2013 | Teraoka ................. | B23K 3/033 219/538 |
| 2013/0270324 | A1* | 10/2013 | Miyazaki ................ | B23K 3/02 228/55 |

* cited by examiner

*Primary Examiner* — Erin B Saad
(74) *Attorney, Agent, or Firm* — Whiteford, Taylor & Preston LLP; Gregory M. Stone

(57) ABSTRACT

Disclosed is a solder punch tool and method of using the same. The solder punch tool includes an extensible rod, such as a graphite rod, extensible from a first end of the solder punch tool, and a metal punch on an opposite end of the solder punch tool. Optionally, an A/C power cord and a light may each be removably attachable to the solder punch tool. In use, a user may melt solder clogging a hole in a printed circuit board, push a portion of the extensible rod through the hole and the molten solder, break off a portion of the extensible rod extending through the hole in the printed circuit board, and push such broken portion of the extensible rod through the hole using the metal punch so as to clear the hole to receive a replacement component.

11 Claims, 3 Drawing Sheets

DESOLDERING APPARATUS AND METHOD

CROSS REFERENCE TO RELATED APPLICATION

This application is based upon and claims benefit of copending U.S. Provisional Patent Application Ser. No. 62/208,947 entitled "SOLDER PUNCH," filed with the United States Patent and Trademark Office on Aug. 24, 2015 by the inventors herein, the specification of which is incorporated herein by reference.

FIELD OF THE INVENTION

This invention relates generally to desoldering apparatus and methods, and more particularly to an apparatus and method for aiding in the removal of waste molten solder from a printed circuit board following desoldering and removal of an electrical component.

BACKGROUND OF THE INVENTION

Printed circuit boards ("PCB") are self-contained modules of interconnected electronic components, and are used in a wide variety of electronic devices. They use conductive pathways to electrically connect electronic components to carry out the electronic functions of the device in which they are installed. The electronic components are typically joined to the PCB via a solder connection, such that when electronic components become damaged and require replacement, the solder connection must be heated so as to melt the solder and allow the electronic component to be pulled away from the PCB. During that process, it is not uncommon for holes that receive electrical connectors from the electronic components to become clogged with solder, requiring further cleaning and servicing in order to make the PCB ready to receive a replacement electronic component.

Efforts have been made to provide devices for the removal of solder during the desoldering process, such as hand-held, spring-loaded devices that create suction at the soldering connection to draw molten solder away from the PCB during the desoldering operation. However, such hand-held devices have had limited success, as they can be quite difficult to use particularly when an operator is tasked with simultaneously holding a soldering iron to melt the pre-existing solder connection while keeping the hand-held desoldering tool in alignment to allow it to collect the molten solder when activated.

SUMMARY OF THE INVENTION

Disclosed herein is a hand-held solder punch tool configured for assisting in opening clogged holes on a PCB that have become clogged by molten solder. The solder punch tool includes an extensible rod, such as a graphite rod, extensible from a first end of the solder punch tool, and a metal punch on an opposite end of the solder punch tool. Optionally, an A/C power cord and a light may each be removably attachable to the solder punch tool. In use, a user may melt solder clogging a hole in a printed circuit board, push a portion of the extensible rod through the hole and the molten solder, break off a portion of the extensible rod extending through the hole in the printed circuit board, and push such broken portion of the extensible rod through the hole using the metal punch so as to clear the hole to receive a replacement component.

In accordance with certain aspects of an embodiment of the invention, a desoldering tool is provided having In accordance with further aspects of an embodiment of the invention, a desoldering method is provided, including the steps of

BRIEF DESCRIPTION OF THE DRAWINGS

The numerous advantages of the present invention may be better understood by those skilled in the art by reference to the accompanying drawings in which.

DETAILED DESCRIPTION

Figure 1:
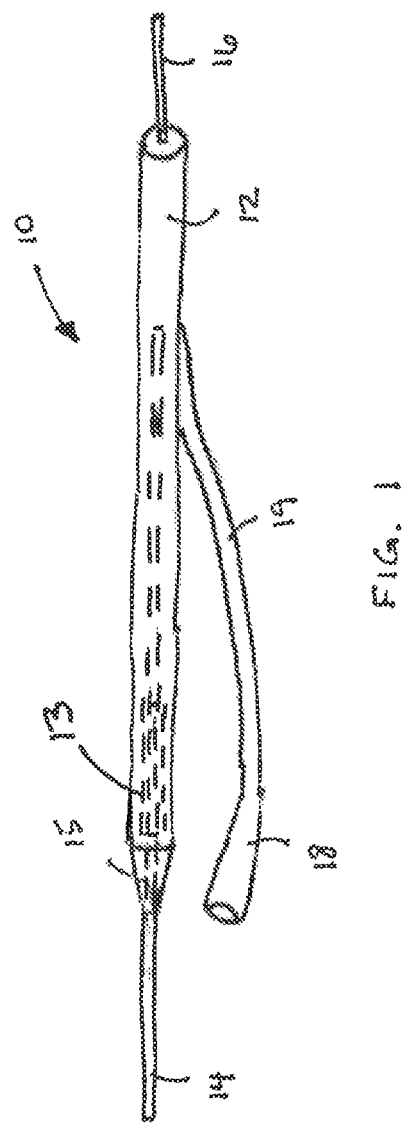
FIG. 1 is a side view of a solder removal tool in accordance with certain aspects of an embodiment of the invention.

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

Disclosed herein is a hand-held solder punch tool configured for assisting in opening clogged holes on a PCB that have become clogged by molten solder. With reference to the perspective view of FIG. 1, a hand-held solder punch tool is shown schematically at 10 incorporating certain aspects of an embodiment of the invention. Solder punch tool 10 includes an elongate shaft 12 suitable for one-handed, pencil-like gripping by a user, allowing the solder punch tool 10 to be manipulated with one hand while, for instance, a soldering iron is manipulated with the user's other hand. An extensible, frangible rod 14 is housed within shaft 12 and is extensible from a first end 15 of solder punch tool 10. Rod 14 is preferably sufficiently rigid so as to not break when it is inserted through a hole in a PCB and through at least partially molten solder in such hole, but likewise frangible enough to allow it to be easily broken off in a section when situated within such a hole in a PCB. A drive mechanism 13 (shown in phantom) is provided inside of shaft 12 for extending and preferably retracting extensible rod 14. For example, drive mechanism 13 may comprise a construction well known to those of ordinary skill in the art that is common to mechanical pencils, in which first end 15 of solder punch tool 10 is rotatable with respect to shaft 12 and engages a feed mechanism of standard construction within shaft 12, such that rotation of first end 15 in a first direction with respect to shaft 12 causes extensible rod 14 to extend from the first end 15 of solder punch tool 10, and rotation of first end 15 in an opposite direction with respect to shaft 12 causes extensible rod 14 to retract into shaft 12 through first end 15. Likewise, drive mechanism 13 may comprise another construction well known to those of ordinary skill in the art that is likewise common to mechanical pencils, in which a ratchet mechanism inside of shaft 12 allows incremental movement of extensible rod 14 upon each activation of such ratchet mechanism, with a release allowing retraction of extensible rod 14 back into shaft 12 when it is no longer in use. Such drive mechanisms are quite well established and their configurations are well known to those of ordinary skill in the art, such that they are not further detailed here.

In certain configurations, extensible rod 14 is preferably formed of graphite, although other materials may likewise form rod 14 that are preferably (i) easily breakable, and (ii) of such material that will not stick to molten solder, for purposes described in greater detail below.

With continued reference to FIG. 1, a second end of shaft 12 is provided a fixed rod 16 that is preferably fixedly attached to a second end of shaft 12 opposite first end 15. In certain configurations, fixed rod 16 is formed of steel, although other materials may be used that have sufficient rigidity to withstand the forces necessary to push a broken piece of extensible rod 14 through a hole in a PCB without bending or breaking.

Each of extensible rod 14 and fixed rod 16 preferably has a diameter sized to fit closely within a standard hole in a PCB, thus allowing both extensible rod 14 and fixed rod 16 to pass through such holes in a PCB with very little clearance, again for purposes discussed in greater detail below.

Further, and with continued reference to FIG. 1, a light source 18, such as an LED, is preferably provided and attached to shaft 12 of solder punch tool 10 via a flexible mounting arm 19. Flexible mounting arm 19 preferably has sufficient flexibility so as to allow it to be manually bent into a desired orientation, but also has sufficient rigidity so as to maintain such orientation after it is so positioned. By way of non-limiting example, flexible mounting arm 19 may comprise an aluminum coil that may be curved to the user's desired position with respect to shaft 12. Light source 18 may optionally be powered by a battery (not shown), which battery may be positioned within the housing of light source 18, or may alternatively be positioned within shaft 12 and in electrical communication with light source 18. Likewise, and as discussed in greater detail below, light source 18 may be powered by an A/C power source.

Figure 2:
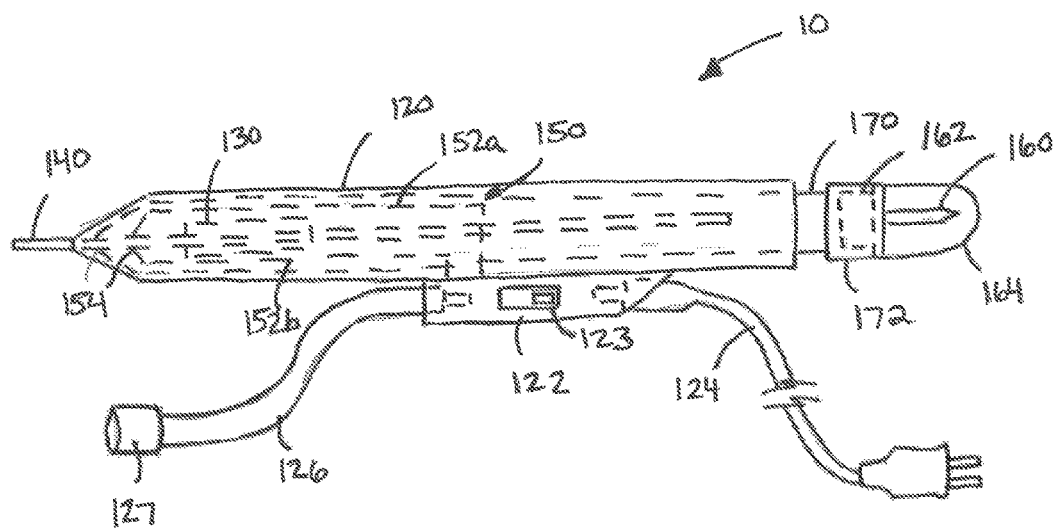
FIG. 2 is a side view of a solder removal tool in accordance with further aspects of an embodiment of the invention.

FIG. 2 provides a side view of a particularly preferred embodiment of solder punch tool 10. As shown in FIG. 2, solder punch 10 may include hollow, generally cylindrical shaft 120 having a tapered dispensing end from which extensible rod 140, and more preferably an extensible graphite rod 140, may extend from and retract into shaft 120. Drive 130 (configured as a rotating drive or ratchet drive as discussed above) is positioned within shaft 120 and engages extensible graphite rod 140. A hollow carrying tube 170 is positioned within shaft 120 and preferably houses drive 130 and extensible graphite rod 140 that is engaged by drive 130, and optionally stores additional graphite rods 140. Optionally, if drive 130 is configured as a ratchet mechanism, carrier tube 170 may be longitudinally moveable within shaft 120 so as to cause drive 130 to sequentially extend a portion of graphite rod 140 outward from shaft 120.

Figure 3:
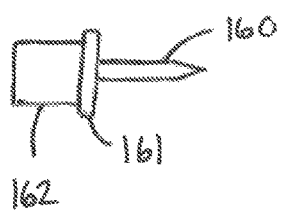
FIG. 3 is a side view of a metal punch for use with the solder removal tool of FIG. 2.

Metal punch 160 is positioned at a back end of solder punch tool 10, and more particularly at the back end of graphite carrier tube 170, such that punch 160 extends in a direction opposite and parallel to the longitudinal axis of extensible rod 140. In a particularly preferred embodiment, the exterior end of carrier tube 170 preferably includes a punch cap receiver 172 having an internal, generally cylindrical cavity, which cavity in punch cap receiver receives therein a base 162 of metal punch 160. As shown in FIG. 3, base 162 of metal punch 160 may be configured for removable insertion into the cavity in punch cap receiver 172, with a flange 161 abutting the outer face punch cap receiver 172. Removal of metal punch 160 from carrier tube 170 allows access to the interior of carrier tube 170 for reloading of additional segments of extensible rod 140. Likewise, a removable plastic cap 164 may be removably positioned over metal punch 160 so as to provide a protective cover when metal punch 160 is not in use. As shown in FIGS. 2 and 3, metal punch 160 preferably includes a sharpened tip to aid in extending through a hole in a PCB, and particularly in engaging a broken piece of extensible rod 140 that has been broken off in a hole in the PCB, as discussed in greater detail below.

With continued reference to FIG. 2, an electrical connector housing 122 may be provided on an exterior of shaft 120. Electrical connector housing 122 may include an on/off power switch 123, an electrical connector for receiving a removable A/C power cord 124, and an electrical connector for receiving a removable light 126. A/C power cord 124 may connect solder punch tool 10 to a standard electrical outlet. When so connected, A/C power may be supplied directly to light 126. Light 126 may include an LED 127 positioned at the end of, by way of non-limiting example, a flexible aluminum coil that will easily bend to a desired shape but maintain such shape after being manually positioned by a user.

Optionally, an internal electrical supply 150 may be provided between electrical connector housing 122 and extensible rod 140 and configured to supply current to extensible rod 140. More particularly, electrical connectors 152a and 152b may extend from electrical connector housing 122 toward the dispensing end of solder punch tool 10. The distal ends of electrical connectors 152a and 152b (i.e., the ends adjacent the dispensing end of solder punch tool 10) are spaced apart so as to form a gap therebetween, which gap is sized so that the distal ends of electrical connectors 152a and 152b will be in contact with extensible rod 140, but will allow longitudinal movement of extensible rod 140 when engaged by drive 130. When extensible rod 140 is formed of graphite, with electrical current supplied to internal electrical supply 150, extensible rod 140 completes an electrical circuit, such that current runs through extensible rod 140. When such current is supplied to extensible rod 140, it will significantly heat to the point of allowing extensible rod 140 itself to serve as a soldering iron.

Figure 4:
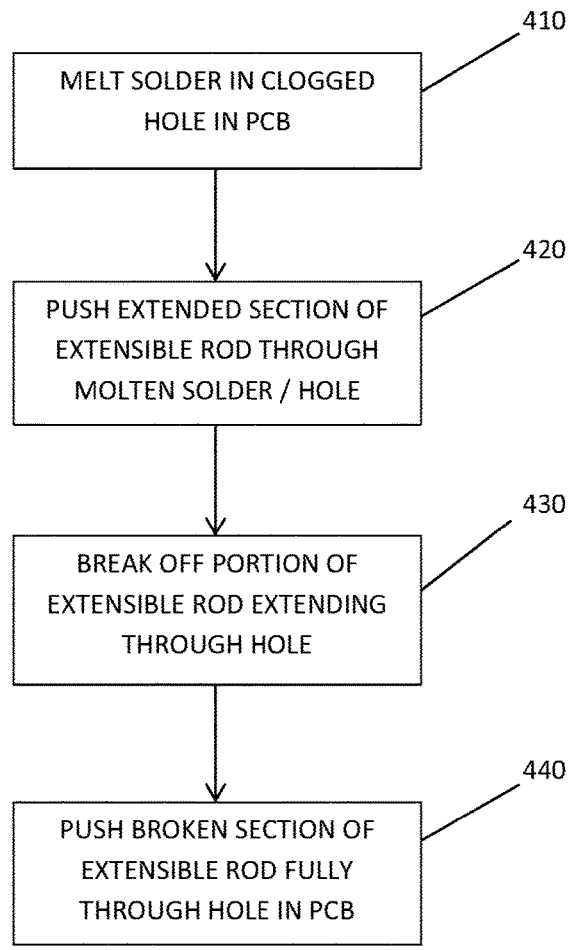
FIG. 4 is a schematic view of a method of using a solder removal tool in accordance with further aspects of an embodiment of the invention.

In accordance with further aspects of the invention, the hand-held solder punch tool 10 described above may be used in the following exemplary manner, and as shown schematically in FIG. 4. When it is desired to remove an electronic component from a PCB, a user melts the solder holding the component to the PCB and removes the component. In those instances in which a hole in the PCB becomes clogged with solder as a result of melting the solder to remove an electronic component, the user may hold a soldering iron in one hand and the solder punch tool 10 in the other hand. As the user applies the soldering iron to the solder at the clogged hole at step 410, it becomes molten, at which time the user may at step 420 push an extended section of extensible rod 14 or 140 through the molten solder and through the hole that such molten solder was previously clogging. After the extensible rod 14 or 140 has been pushed through the hole, the user may at step 430 break off the portion of the extensible rod 14 or 140 that extends through the hole. The molten solder will thereafter quickly cool, but will not stick to extensible rod 14 or 140, and thus will not reclog the hole through which extensible rod 14 or 140 has been pushed. Thereafter, the user may turn solder punch tool 10 so that fixed rod 16 or 160 is facing the hole in the PCB, and may at step 440 push the broken section of extensible rod 14 or 140 fully through the hole in the PCB with fixed rod 16 or 160, and thereafter withdraw fixed rod 16 or 160 from the PCB to leave a clean, unclogged hole that is ready to receive a replacement component.

Optionally, in order to desolder the component from the PCB, and as a preliminary step, the user may apply electrical current to the extensible rod 140, touch extensible rod 140 to the solder connection to melt the solder, remove the component from the PCB, and engage drive 130 to extend additional, unused extensible rod 140 (some having been spent and evaporated during the desoldering operation) to carry out the remaining steps of the process described above.

When desired, light source 18 or 127 may be manually positioned to shine on the hole that is to be processed, and power switch 123 may be operated to power light source 18 or 127 so as to aid the operator in viewing the working field on the PCB requiring placement of the extensible rod and fixed rod.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It should be understood, therefore, that the invention may be practiced otherwise than as specifically set forth herein.

The invention claimed is:

1. A method for removing solder from a printed circuit board, comprising the steps of:
   providing a solder removal tool, said solder removal tool further comprising:
      a hollow shaft adapted for one-handed gripping by a user, said hollow shaft having a first end and a second end opposite said first end;
      an extensible rod extensible from said first end of said shaft; and
      a metal punch extending outward from said second end of said hollow shaft;
   pushing said extensible rod through molten solder in a hole in a printed circuit board;
   breaking off a portion of said extensible rod so that said broken-off portion remains in said hole in said printed circuit board; and
   pushing said broken portion of said extensible rod through said hole using said metal punch.

2. The method of claim 1, said solder removal tool further comprising a drive within said hollow shaft and engaging said extensible rod to incrementally extend said extensible rod from said first end of said shaft.

3. The method of claim 1, wherein said extensible rod further comprises graphite.

4. The method of claim 1, wherein said metal punch is removably attached to said second end of said hollow shaft.

5. The method of claim 1, wherein said solder removal tool further comprises a graphite carrier tube within said hollow shaft.

6. The method of claim 5, wherein said metal punch is removably positioned within an end of said graphite carrier tube.

7. The method of claim 1, wherein said solder removal tool further comprises a removable cap positioned over said metal punch.

8. The method of claim 1, wherein said solder removal tool further comprises an electrical connector housing attached to said shaft.

9. The method of claim 8, wherein said solder removal tool further comprises a light removably attached to said housing.

10. The method of claim 8, wherein said solder removal tool further comprises an A/C connector removably attached to said housing.

11. The method of claim 10, wherein said electrical connection extends from said housing to said extensible rod.

\* \* \* \* \*